E. H. WULFF.
COLLAPSIBLE DEMOUNTABLE RIM.
APPLICATION FILED JAN. 9, 1918.
1,292,945.
Patented Jan. 28, 1919.
2 SHEETS—SHEET 1.
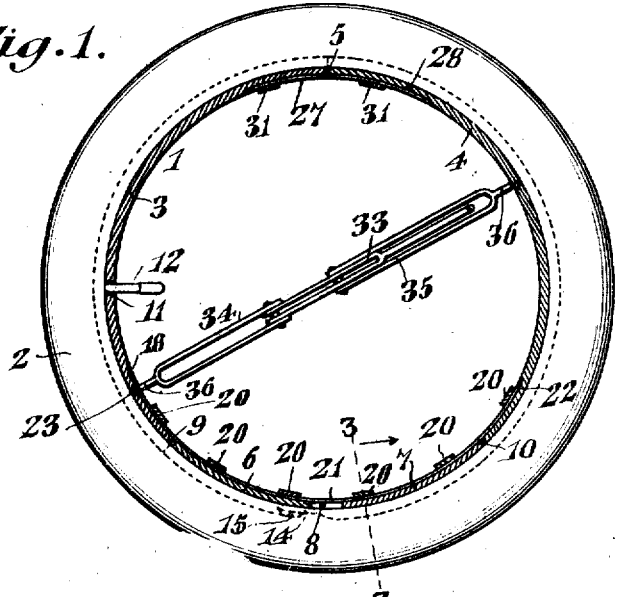
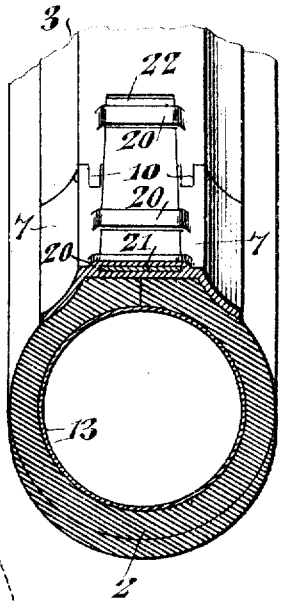
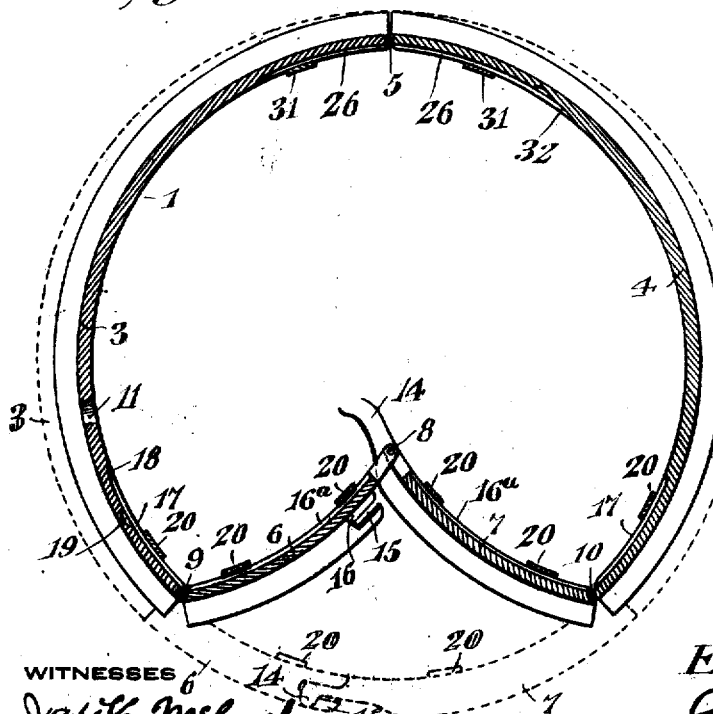
WITNESSES
Jas. K. McCathran
H. T. Chapman
INVENTOR
Ezra H. Wulff,
BY
E. G. Siggers
ATTORNEY

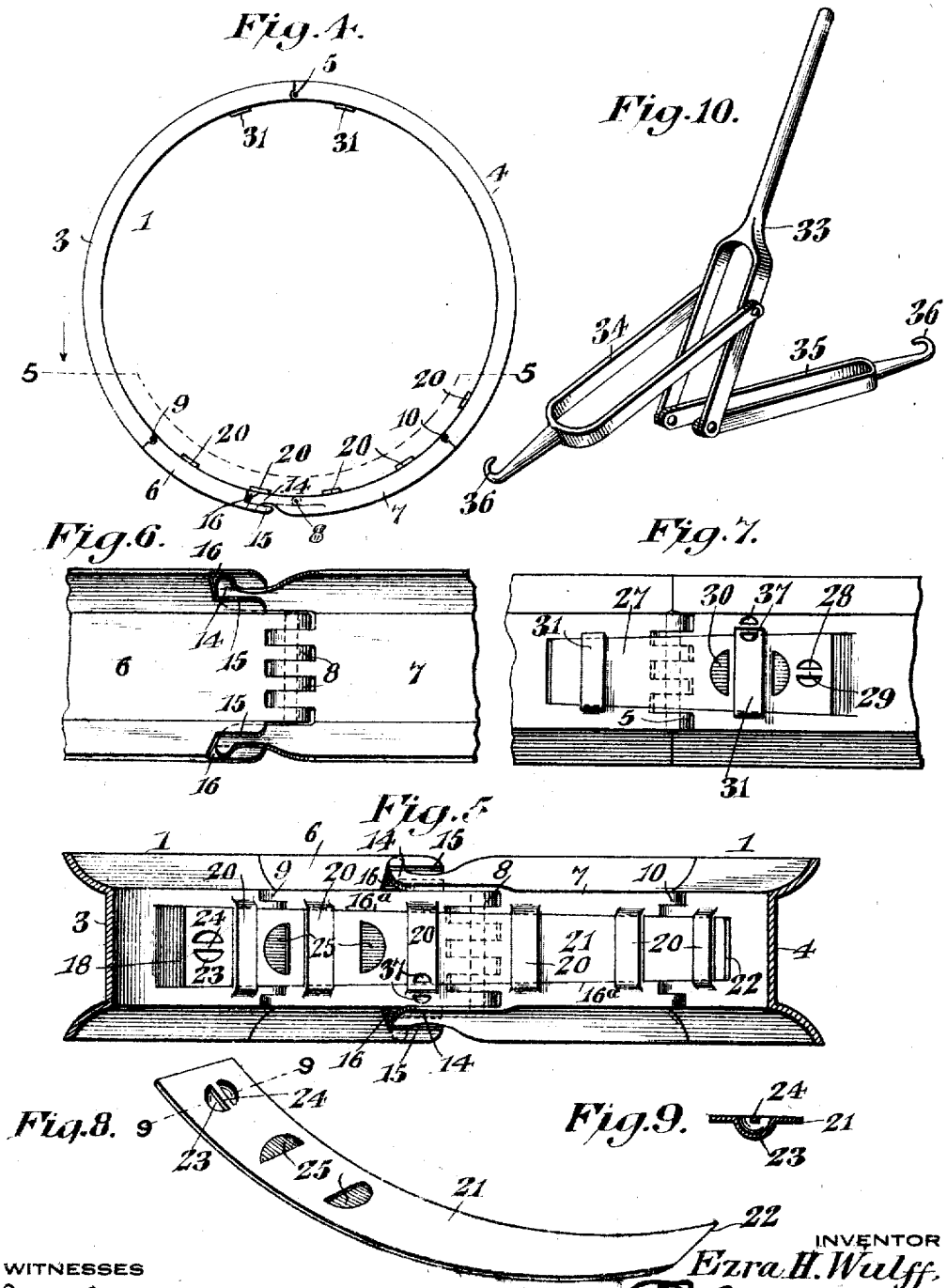

UNITED STATES PATENT OFFICE.

EZRA HERMAN WULFF, OF TOLEDO, OHIO.

COLLAPSIBLE DEMOUNTABLE RIM.

1,292,945.  Specification of Letters Patent.  Patented Jan. 28, 1919.

Application filed January 9, 1918. Serial No. 211,020.

*To all whom it may concern:*

Be it known that I, EZRA H. WULFF, a citizen of the United States, residing at Toledo, in the county of Lucas and State of Ohio, have invented a new and useful Collapsible Demountable Rim, of which the following is a specification.

This invention has reference to collapsible demountable rims, and its object is to provide a demountable rim for automobile tires on which the tire may be placed, or from which it may be taken with a minimum amount of labor.

In accordance with the invention, the rim comprises a plurality of sections hinged together, so that its effective diameter may be reduced to permit it to be placed within the tire casing and then expanded to the full diameter, thus doing away with the necessity of prying the casing on or off the rim. Where the rim sections are hinged together, stiffening strips are provided, so that there is no liability of collapse of the rim under the tire pressure, whether or not the rim be on the wheel, but on the removal of the stiffening strips, the collapse of the rim is readily accomplished. Furthermore, at the point where the collapsing break of the rib is accomplished, bridging means are provided to cross the gap in the rim at the breaking point.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings but may be changed and modified so long as such changes and modifications come within the scope of the appended claims.

In the drawings:—

Figure 1 is an elevation of the collapsible rim with the tire applied thereto, the rim being shown in circumferential section;

Fig. 2 is a circumferential section of the rim in the collapsed condition;

Fig. 3 is a cross section on the line 3—3 of Fig. 1, but shown on a larger scale;

Fig. 4 is an elevation of the rim, with the tire omitted;

Fig. 5 is a section on the line 5—5 of Fig. 4, but drawn on a larger scale;

Fig. 6 is a face view of the breaking hinge of the rim seen at the bottom of Fig. 4, the view being on a larger scale than Fig. 4;

Fig. 7 is a rear view of the hinge shown at the top of Fig. 4, and drawn on the scale of Fig. 6;

Fig. 8 is a perspective view of one of the hinge stiffening strips;

Fig. 9 is a detail section on the line 9—9 of Fig. 8;

Fig. 10 is a perspective view of a tool for collapsing the rim.

Referring to the drawings, there is shown a rim 1 of suitable shape to receive and retain a pneumatic tire 2 of customary construction. The rim is composed of two sections 3 and 4 connected together at one end by a hinge 5, and other two sections 6 and 7 connected together at one end by a hinge 8, while the other ends of the sections 6 and 7 are connected to the sections 3 and 4 by respective hinges 9 and 10. The hinge 9 connects the section 6 to the section 3, and the hinge 10 connects the section 7 to the section 4. The rim is thus composed of four sections, with the sections 3 and 4 considerably longer than the sections 6 and 7. In the particular construction shown, the combined length of the sections 6 and 7 is less than that of either section 3 or 4. One section, say the section 3, is provided with a passage 11 for the usual nipple 12 of the customary inner tube 13 of the tire 2.

The hinge 8 is somewhat elongated circumferentially of the rim to permit the two sections 6 and 7 to approach as the rim is broken inwardly toward the center of the structure, the sections 6 and 2, and the sections 7 and 4, breaking to a far less extent, while the sections 3 and 4 at the hinge 5 move but slightly from circumferential relation. In order to permit the more extensive breaking at the hinge 8, the sides of the rim, which are of channel form, have prolongations 14 from the section 7 beyond the hinge 8, while the sides of the section 6 are less extensive and do not reach the hinge 8, but at their ends toward the hinge 8, are provided with notches or recesses 15 extending lengthwise of the section 6, and cut away as indicated at 16 to receive the extensions 14, so that the latter constitute bridging pieces supporting the bead portions of the tire casing 2 across the hinge 8. When the rim is expanded to the full circular position, the extensions 14 enter the recesses 15, and constitute a bridging lock across the hinge 8, thus preventing the pressure within the blown up tire from causing blow-outs at the hinge 8 due to lack of support.

To prevent collapse of the rim at the hinges, especially when the tire is being subjected to high internal pressure, the sections 6 and 7 are formed with longitudinal channels 16ª on their inner faces. The adjacent portions of the sections 3 and 4 have similar channels 17 forming continuations of the channels 16ª, and one of the channels, say that in the section 3, has a shallowing termination 18, and is provided with a bottom notch or identation 19. The different channels 16ª and 17 are crossed by bridge pieces 20 projecting from the inner face of the rim. The channels 16ª and 17 are designed to seat a holding strip 21 having one end 22 tapered to facilitate the threading of the strip through the channels 16ª and 17 beneath the bridge pieces or guards 20 when the rim is in the expanded condition. The strip 21 is shown as somewhat beveled lengthwise, and the channels 16ª and 17 are similarly beveled to seat the strip, wherefore, when the strip is lodged in the channels, it may fit sufficiently tight to prevent rattling. Near the wide end, which is the end remote from the beveled end 22, the strip is provided with a hollow lug 23 in position to seat in the notch 19, this constituting a temporary lock for holding the strip 21 against accidental displacement. Across the interior of the lug 23 there is a bar 24, whereby a tool may be applied to bend the strip to facilitate its removal from the channels in which it is lodged. Finger recesses 25 are also formed in the strip to facilitate the removal or insertion thereof, as desired.

The strip 21 is long enough to bridge the three hinges 8, 9 and 10, and so prevent the accidental collapse of the rim at all three points.

The hinge 5 is diametrically opposite from the hinge 8, and the rim sections 3 and 4 have channels 26 in matching relation for the reception of another holding strip 27 similar to the strip 21, but of less length. The strip 27 is tapered lengthwise like the strip 21, and has a hollow lug 28 with a bar 29 thereacross, like the lug 23 and bar 24 of the strip 21. The strip 27 is also provided with finger recesses 30, like the recesses 25 of the strip 21. Moreover, the rim members 3 and 4 have bridge pieces 31 crossing the channels 26, like the bridge members 20 of the channels in the members 6 and 7 of the rim. One of the channels 26 has a beveled or tapered entering end 32 like the similar part 18 of one of the channels 17.

In order to facilitate the collapsing of the rim and also to aid in the expansion thereof, there is provided a tool shown separately in Fig. 10, and also shown in Fig. 1. This tool comprises a handle member 33 and two other members 34 and 35 respectively, each terminating in a hook 36 and each at the other end joined to the handle member 33, the member 35 at the extremity of the handle member, and the member 34 at an intermediate point thereof. The tool is so constructed that the hook ends 36 may be drawn toward each other or moved away from each other in accordance with the direction of movement of the handle member 33.

When it is desired to remove the tire from the rim, the tool is first engaged with the bar 34 of the strip 21, so that the corresponding end of the strip may be lifted out of the channels 17 to permit the strip to be slid along the channels in which it is seated, and so removed therefrom. Similarly, the strip 27 is removed. This places the rim in condition for collapsing, and then the tool is engaged in other members 37 in bridge pieces 20 and 31 adjacent to the hinges 8 and 5. By operating the tool handle 33 so as to shorten the tool, the members 6 and 7 of the rim are caused to break at the hinge 8 by drawing the latter toward the center of the rim, whereby the effective size of the rim is reduced sufficiently to permit the rim to be wholly released from the tire without the necessity of prying the latter from the rim. To replace the tire on the rim, the latter is located within the tire, and then expanded by reversing the operations described, the strips 21 and 27 being replaced to prevent accidental collapse of the rim.

It will be understood, of course, that the placing of the rim within the tire and the removal of the tire from the rim are accomplished while the rim and tire are separated from the wheel body. The mounting of the rim upon the wheel forms no part of this invention, and therefore is neither shown nor described, but may follow the usual custom, the spacing of the rim from the felly of the wheel affording ample room for the bridge pieces, and other parts on the inner face of the rim.

The hinge holding or locking strips 21 and 27 not only prevent loosening of the rim while on the wheel, but are available in preventing collapse of the rim when employed as an extra, and when substituting such rim with the tire thereon for a rim having a punctured or otherwise defective tire.

What is claimed is:—

1. A collapsible tire rim comprising a circular series of rim segments hinged together at their meeting ends, and hinge reinforcing strips arranged to bridge the hinges on the inner face of the rim to prevent accidental collapse of the rim.

2. A collapsible tire rim comprising a circular series of rim segments hinged together at their meeting ends, with two of the hinge segments capable of breaking or buckling toward the central portion of the rim, and said breaking or buckling segments having side members bridging the space between the meeting ends thereof and the members on the same side of the last-named segments overlapping and interlocking one with the other.

3. A collapsible tire rim comprising a circular series of channel rim sections or segments hinged together at their meeting ends, one of two meeting sections having its sides prolonged and overlapping the corresponding sides of the other section when the rim is expanded, and the second section having its sides provided with recesses open at the outer ends and receiving the prolongations of the sides of the first-named section.

4. A collapsible tire rim comprising a circular series of rim sections or segments hinged together at their meeting ends, with two of the sections having their hinge connections prolongated to permit the breaking or buckling thereof toward the center of the rim, one of said two sections having its side portions prolonged beyond the hinge to constitute tongues, and the other of said two sections having its side portions stopping short of the hinge and provided with recesses for receiving the tongues, whereby the sections interlock when the rim is expanded, and the tongues bridge the space between the sections due to the prolongation of the hinge.

5. A collapsible tire rim comprising a circular series of sections hinged together at their meeting ends for the collapsing of the rim, said sections on opposite sides of the hinge connections having matching channels with bridge pieces extending across them, and strips adapted to be lodged in the channels beneath the bridge pieces for stiffening the hinges and preventing the collapse of the rim.

6. A collapsible tire rim comprising a circular series of sections hinged together at their meeting ends for the collapsing of the rim, said sections on opposite sides of the hinge connections having matching channels with bridge pieces extending across them, and strips adapted to be lodged in the channels beneath the bridge pieces for stiffening the hinges and preventing the collapse of the rim, said strips each being provided with finger recesses and with a hollow lug at one end with a cross member for the application of a removing tool.

7. A collapsible tire rim comprising a circular series of rim sections or segments hinged together at the meeting ends, with the hinge of two joined sections arranged for collapsing or buckling toward the central portion of the rim, said sections where hinged together having matching channels on the inner face of the rim, with the channels tapering in the direction of their lengths, and tapering strips adapted to seat in the tapering channels, said strips each having finger-receiving recesses and a hollow lug with a cross member, and certain of the rim segments being provided with notches in the channels for receiving the hollow lugs.

In testimony that I claim the foregoing as my own, I have hereto affixed my signature in the presence of two witnesses.

EZRA HERMAN WULFF.

Witnesses:
ALFRED M. DUCEY,
RALPH W. OLIVER.